United States Patent
Cohen

(10) Patent No.: US 11,493,920 B2
(45) Date of Patent: Nov. 8, 2022

(54) AUTONOMOUS VEHICLE INTEGRATED USER ALERT AND ENVIRONMENTAL LABELING

(71) Applicant: UATC, LLC, San Francisco, CA (US)

(72) Inventor: Eyal Cohen, San Francisco, CA (US)

(73) Assignee: UATC, LLC, San Francisco, CA (US)

( * ) Notice: Subject to any disclaimer, the term of this patent is extended or adjusted under 35 U.S.C. 154(b) by 573 days.

(21) Appl. No.: 15/919,917

(22) Filed: Mar. 13, 2018

(65) Prior Publication Data
US 2019/0243364 A1 Aug. 8, 2019

Related U.S. Application Data

(60) Provisional application No. 62/625,868, filed on Feb. 2, 2018.

(51) Int. Cl.
| | |
|---|---|
| *G05D 1/00* | (2006.01) |
| *G05D 1/02* | (2020.01) |
| *B60Q 9/00* | (2006.01) |
| *G08B 21/06* | (2006.01) |
| *G06V 20/20* | (2022.01) |
| *G06V 20/58* | (2022.01) |
| *G06V 20/59* | (2022.01) |
| *G08B 21/18* | (2006.01) |

(52) U.S. Cl.
CPC ............ *G05D 1/0088* (2013.01); *B60Q 9/00* (2013.01); *G05D 1/0061* (2013.01); *G05D 1/0221* (2013.01); *G05D 1/0238* (2013.01); *G06V 20/20* (2022.01); *G06V 20/58* (2022.01); *G06V 20/597* (2022.01); *G08B 21/06* (2013.01); *G08B 21/182* (2013.01); *G05D 2201/0213* (2013.01)

(58) Field of Classification Search
None
See application file for complete search history.

(56) References Cited

U.S. PATENT DOCUMENTS

| | | |
|---|---|---|
| 5,097,429 A | 3/1992 | Wood et al. |
| 6,903,676 B1 | 6/2005 | Frady et al. |
| 7,451,005 B2 | 11/2008 | Hoffberg et al. |
| 9,418,381 B2 | 8/2016 | Ahuja et al. |
| 9,922,559 B1 | 3/2018 | Inoue |
| 10,181,541 B2 | 1/2019 | Moslehi |
| 10,361,802 B1 | 7/2019 | Hoffberg-borghesani et al. |

(Continued)

OTHER PUBLICATIONS

"U.S. Appl. No. 15/919,926, Examiner Interview Summary dated Sep. 15, 2020", 3 pgs.

(Continued)

*Primary Examiner* — Thomas E Worden
(74) *Attorney, Agent, or Firm* — Schwegman Lundberg & Woessner, P.A.

(57) ABSTRACT

Various examples are directed to systems and method operating an autonomous vehicle. A vehicle system may receive a plurality of inputs from a user of a vehicle, where the plurality of inputs includes a first labeling input received from the user and a first alert input received from the user. After determining that no user input has been received for an input threshold time, the vehicle system provides an alert prompt to the cockpit output device. This may cause the cockpit output device to provide the alert prompt to signal to the user to provide an alert input indicating that the user is alert.

20 Claims, 9 Drawing Sheets

(56) References Cited

U.S. PATENT DOCUMENTS

| | | | |
|---|---|---|---|
| 10,564,638 B1* | 2/2020 | Lockwood | G05D 1/0044 |
| 10,730,181 B1* | 8/2020 | Rajkumar | B25J 9/1653 |
| 10,761,542 B1* | 9/2020 | Fairfield | G05D 1/0038 |
| 2004/0130442 A1 | 7/2004 | Breed et al. | |
| 2007/0063875 A1 | 3/2007 | Hoffberg | |
| 2011/0082618 A1 | 4/2011 | Small et al. | |
| 2011/0082619 A1 | 4/2011 | Small et al. | |
| 2011/0082620 A1 | 4/2011 | Small et al. | |
| 2012/0029964 A1 | 2/2012 | Tengler et al. | |
| 2015/0339589 A1 | 11/2015 | Fisher | |
| 2017/0329331 A1* | 11/2017 | Gao | B60W 30/10 |
| 2017/0363430 A1 | 12/2017 | Al-dahle et al. | |
| 2018/0190046 A1 | 7/2018 | Levinson et al. | |
| 2018/0218238 A1 | 8/2018 | Viirre et al. | |
| 2018/0275667 A1* | 9/2018 | Liu | B60W 50/029 |
| 2018/0288182 A1* | 10/2018 | Tong | G06F 16/24568 |
| 2018/0304993 A1* | 10/2018 | Offredi | B64C 13/18 |
| 2019/0103026 A1* | 4/2019 | Liu | G06V 10/25 |
| 2019/0176837 A1 | 6/2019 | Williams et al. | |
| 2019/0241122 A1 | 8/2019 | Cohen | |
| 2019/0248374 A1* | 8/2019 | Aizawa | G05D 1/0061 |
| 2019/0384304 A1 | 12/2019 | Towal et al. | |
| 2020/0023863 A1* | 1/2020 | Aizawa | G06K 9/00845 |
| 2020/0209875 A1* | 7/2020 | Marzani | G06V 20/58 |

OTHER PUBLICATIONS

"U.S. Appl. No. 15/919,926, Examiner Interview Summary dated Sep. 16, 2020", 4 pgs.

"U.S. Appl. No. 15/919,926, Response filed Sep. 18, 2020 to Final Office Action dated Jun. 18, 2020", 10 pgs.

"U.S. Appl. No. 15/919,926, Notice of Allowance dated Oct. 2, 2020", 25 pgs.

"U.S. Appl. No. 15/919,926, Notice of Allowance dated Oct. 6, 2020", 4 pgs.

"U.S. Appl. No. 15/919,926, Response filed Oct. 15, 2019 to Final Office Action dated Aug. 15, 2019", 12 pgs.

"U.S. Appl. No. 15/919,926, Advisory Action dated Nov. 7, 2019", 8 pgs.

"U.S. Appl. No. 15/919,926, Examiner Interview Summary dated Nov. 20, 2019", 3 pgs.

"U.S. Appl. No. 15/919,926, Examiner Interview Summary dated Nov. 22, 2019", 4 pgs.

"U.S. Appl. No. 15/919,926, Non Final Office Action dated Jan. 2, 2020", 36 pgs.

"U.S. Appl. No. 15/919,926, Response filed Apr. 2, 2020 to Non Final Office Action dated Jan. 2, 2020", 10 pgs.

"U.S. Appl. No. 15/919,926, Final Office Action dated Jun. 18, 2020", 39 pgs.

"U.S. Appl. No. 15/919,926, Non Final Office Action dated Jan. 24, 2019", 22 pgs.

"U.S. Appl. No. 15/919,926, Examiner Interview Summary dated Apr. 25, 2019", 3 pgs.

"U.S. Appl. No. 15/919,926, Examiner Interview Summary dated May 1, 2019", 4 pgs.

"U.S. Appl. No. 15/919,926, Response filed May 22, 2019 to Non Final Office Action dated Jan. 24, 2019", 15 pgs.

"U.S. Appl. No. 15/919,926, Final Office Action dated Aug. 15, 2019", 30 pgs.

* cited by examiner

AUTONOMOUS VEHICLE INTEGRATED USER ALERT AND ENVIRONMENTAL LABELING

CLAIM FOR PRIORITY

This application claims the benefit of priority of U.S. Provisional Application No. 62/625,868, filed Feb. 2, 2018, which is hereby incorporated by reference in its entirety.

FIELD

The document pertains generally, but not by way of limitation, to devices, systems, and methods for operating an autonomous or semi-autonomous vehicle.

BACKGROUND

An autonomous vehicle is a vehicle that is capable of sensing its environment and operating some or all of the vehicle's controls based on the sensed environment. An autonomous vehicle includes sensors that capture signals describing the environment surrounding the vehicle. The autonomous vehicle processes the captured sensor signals to comprehend the environment and automatically operates some or all of the vehicle's controls based on to the resulting information.

DRAWINGS

In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DESCRIPTION

Figure 1:
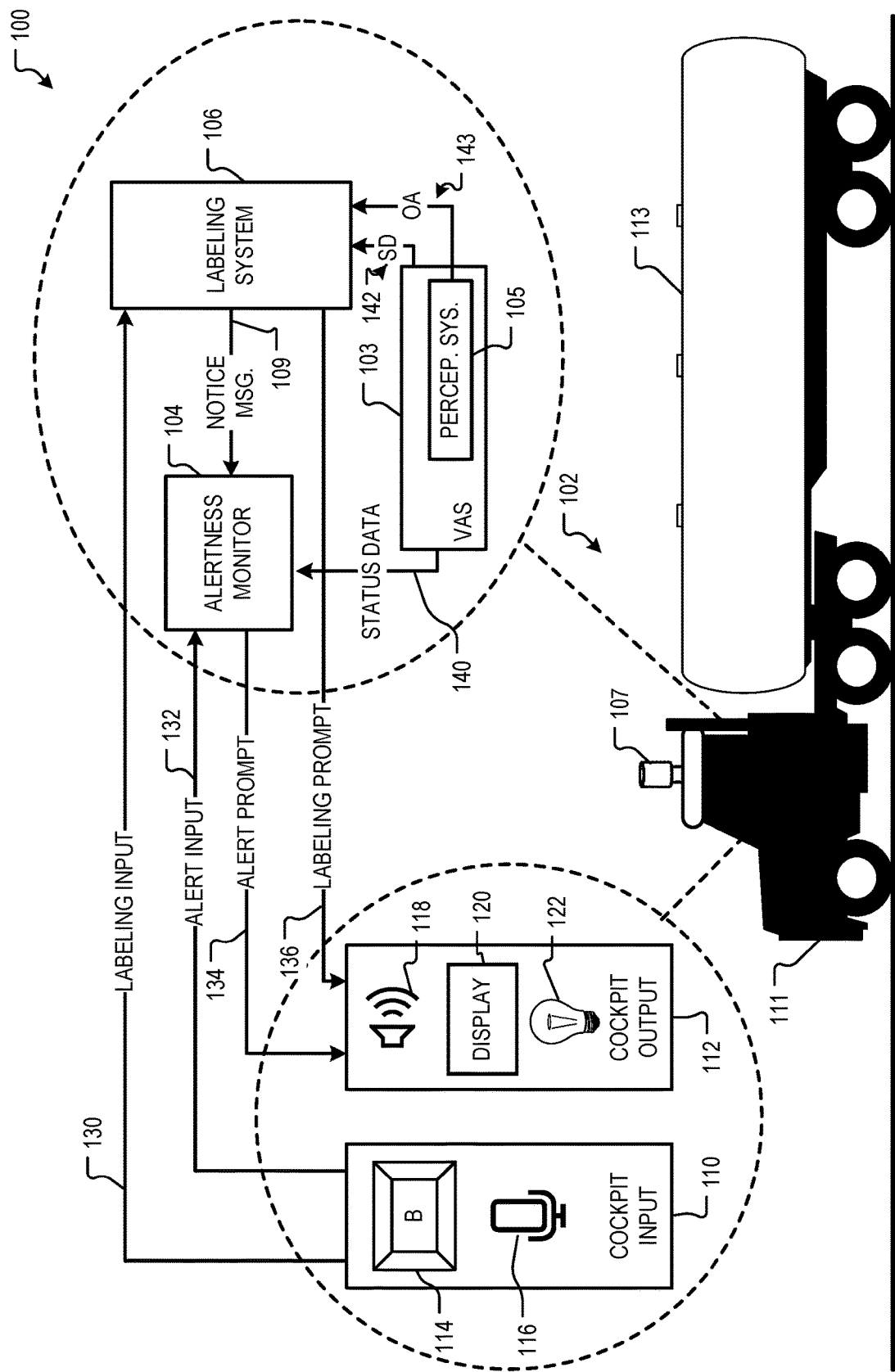
FIG. 1 is a diagram showing one embodiment of an environment for implementing integrated driver alertness monitor and training data labeling.

Examples described herein are directed to systems and methods for combined driver alert tracking and artificial intelligence training in autonomous and semi-autonomous vehicles.

In an autonomous or semi-autonomous vehicle, an autonomous vehicle (AV) control system controls one or more of braking, steering, or throttle of the vehicle. In a fully-autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input.

When the vehicle autonomy system is controlling some or all of the controls of a vehicle, it may be desirable to ensure that a human user, such as a driver or vehicle operator, is alert and minding the vehicle. For example, if the vehicle autonomy system disengages or otherwise encounters an error, or where the vehicle encounters a particular type of event, the user may want or need to assume control of the vehicle, sometimes on short notice. Further, some jurisdictions encourage or require operators of autonomous or semi-autonomous vehicles to monitor and sometimes prove operator attentiveness while the vehicle is in use.

In some examples, the vehicle includes an alertness monitor to monitor and help maintain driver alertness. The alertness monitor system periodically sends an alert prompt to the human user, for example, using a cockpit output device such as a light, a speaker, a buzzer, etc. The alert prompt serves as an indication to the user to respond with an input that indicates confirmation that the user is alert. In response to providing the alert prompt, the alertness monitor is configured to receive, from the user, an alert input via a cockpit input device (e.g., a microphone, a button) in a vehicle cockpit. In response to receiving the alert response from the user, the alertness monitor determines that the user is alert and is monitoring the operation of the vehicle. In certain examples, the alertness monitor system stores a history of the prompt-response engagements between the alertness monitor system and the user for post-operation review and analysis.

Also, the vehicle autonomy system is trained to recognize and/or respond to events in the vehicle's environment. In an example embodiment, the vehicle autonomy system is trained offline. Objects include things potentially around the vehicle or in the environment in which the vehicle can operate, such as, other cars and vehicles, pedestrians, traffic signals, traffic signs, land marks, buildings, obstacles in the vehicle's path, roadway, roadway features (e.g., lanes, crosswalks and other road markings, sidewalks, etc.

The vehicle autonomy system is trained to recognize objects, anticipate what the objects will do, and respond by making appropriate inputs to the vehicle controls. Consider an example in which a pedestrian is jaywalking in front of the vehicle as a traffic light turns green. The vehicle autonomy system receives remote-sensing data (e.g., camera, light detection and ranging (LIDAR) data, radio detection and ranging (RADAR) data, or sound navigation and ranging (SONAR) data) that is affected by the presence of the pedestrian. The vehicle autonomy system is trained to recognize that the remote-sensing data indicates a pedestrian and responds by delaying movement of the vehicle until the pedestrian has passed. Consider a similar example in which a plastic grocery bag blows in front of the vehicle as the traffic light turns green. In this example, the vehicle autonomy system is trained to recognize that the remote-sensing data indicates a plastic bag and responds by accelerating as normal (e.g., because hitting the plastic bag will not harm people or property).

In particular, the vehicle autonomy system may include a perception system that receives remote-sensing data and identifies objects indicated by the remote-sensing data. The perception system is trained to relate patterns in remote-sensing data to particular objects and, in some examples, to particular object behaviors.

Training the perception system includes providing the perception system with training data. In an example, a package of training data (e.g., a training data package) includes remote-sensing data and metadata that describes aspects of the remote-sensing data for training. For example, the metadata can serve as labels for various aspects of the remote-sensing data, such as describing which object or objects that were present when the remote-sensing data was captured. The metadata can also describe what portions of the remote-sensing data corresponds to the objects. For example, metadata can indicate which frames of a video, and which pixels of the frames, correspond to an identified object. In the case of LIDAR data, the metadata can indicate which points (e.g., return signals) of a point cloud represents the object to be identified. Training data can include remote-sensing data from multiple sensors and from multiple types of sensors.

Returning to the examples above, to recognize a pedestrian in the path of the vehicle, the perception system is trained with training data corresponding to outputs of various remote sensing devices at a time when a pedestrian is known to be in the front of the vehicle. The perception system may also be trained with training data showing outputs of various remote sensing devices at a time when a plastic bag is known to be in front of the vehicle, to train the perception system to distinguish between the plastic bag from a pedestrian and/or to be able identify the object as a plastic bag. Various other training data reflect the output of remote sensing devices when other known objects are present in the environment of the vehicle.

Additionally or alternatively, in example embodiments, the metadata of the training data can be used to label various aspects of the remote-sensing data, such as geographical location, environment type, time of year, time of day, weather conditions, road conditions, traffic conditions, and one or more of the like information.

To enable the perception system to correctly detect the variety of objects that the vehicle encounters on the road, it is desirable to obtain a wide range of training data. In various examples, a human user in the vehicle provides labeling inputs. Labeling inputs identify, classify, or otherwise describe objects in the environment of the vehicle. Labeling can be done online or offline and can be labor intensive.

As described herein, the vehicle may include a labeling system that is part of and/or works in conjunction with the vehicle autonomy system. For example, the labeling system and/or autonomy system matches labeling inputs with remote-sensing data captured at the time that a labeling input is received to generate training data, for example, as one or more training data packages including remote-sensing data and metadata. Training data captured in this way may be used to train the perception system.

In some examples, it is desirable to monitor the alertness of the user and to generate training data at the same time. Operating independent labeling and alertness monitors, however, risks overloading the user. For example, if the user is providing labeling input at the time that an alertness monitor expects an alert input, the user may fail to provide the alert input. This may affect the record of the alertness monitor and/or, in some implementations, cause the vehicle autonomy system to disengage or the vehicle to pull over. Even if the user is able to provide the alert input, providing both alert inputs and labeling inputs may unnecessarily distract the user.

Various examples include systems and methods with integrated user inputs and labeling inputs. A labeling system receives labeling inputs from the user. Labeling inputs may be solicited or unsolicited, as described herein. An alertness monitor is programmed to provide alert prompts to the user and receive alert inputs. The alertness monitor monitors both labeling inputs and alert inputs received from the user. If no input (e.g., labeling input or alert input) has been received for more than an input threshold time, the alertness monitor sends an alert prompt to the user. The user may respond to the alert prompt by providing an alert input. In some examples, if no response to the alert prompt is received within a response threshold time, the alertness monitor executes a remedial action such as, for example, disengaging the vehicle autonomy system, pulling over the vehicle, etc.

The vehicle includes one or more cockpit input devices and one or more cockpit output devices for sending inputs and receiving prompts and other information from the alertness monitor or vehicle autonomy system. A cockpit output device is positioned in the cockpit of the vehicle (e.g., near the user). Example cockpit output devices include speakers, display lights such as light emitting diodes (LEDs), display screens, etc. Cockpit input devices are also positioned in the cockpit of the vehicle, for example, within range of the user. Example cockpit input devices include one or more buttons positioned on or near a steering wheel or other location in the vehicle cockpit, a microphone to capture the user's voice or other audible input, and so forth.

FIG. 1 is a diagram showing one embodiment of an environment 100 for implementing integrated driver alertness monitor and training data labeling. The environment 100 includes a vehicle 102 having an alertness monitor 104 and a labeling system 106. In the example of FIG. 1, the vehicle 102 is a tractor-trailer including a tractor 111 and a trailer 113. In various other examples, the vehicle 102 does not include a trailer and may be, for example, a dump truck, a bus, or any other similar vehicle. Also, in some examples, the vehicle 102 is a passenger vehicle.

The vehicle 102 is a self-driving vehicle (SDV) or autonomous vehicle (AV). A vehicle autonomy system 103, for example, is configured to operate some or all of the controls of the vehicle 102 (e.g., acceleration, braking, steering). In some examples, the alertness monitor 104 and labeling system 106 are components of the vehicle autonomy system 103. The vehicle autonomy system 103, in some examples, is operable in different modes in which the vehicle autonomy system 103 has differing levels of control over the vehicle 102. In some examples, the vehicle autonomy system 103 is operable in a full autonomous mode in which the vehicle autonomy system 103 assumes responsibility for all or most of the controls of the vehicle 102. In addition to or instead of the full autonomous mode, the vehicle autonomy system 103, in some examples, is operable in a semi-autonomous mode in which a human user or driver is responsible for some or all control of the vehicle 102. Additional details of an example vehicle autonomy system are provided in FIG. 2.

The vehicle 102 has one or more remote detection or sensing sensors 107 that receive return signals from the environment 100. Return signals may be reflected from objects in the environment 100, such as the ground, buildings, trees, etc. The remote detection sensors 107 may include one or more active sensors, such as light detection and ranging (LIDAR), radio detection and ranging (RADAR), or sound navigation and ranging (SONAR) that emit sound or electromagnetic radiation in the form of light or radio waves to generate return signals. The remote detection sensors 107 may also include one or more active sensors, such as cameras or other imaging sensors, proximity sensors, etc. Information about the environment 100 is extracted from the return signals. In some examples, the remote detection sensors 107 include a passive sensor that receive reflected ambient light or other radiation, such as a set of monoscopic or stereoscopic cameras. Remote detection sensors 107 provide remote-sensing data that describes the environment 100.

The vehicle 102 also includes one or more cockpit input devices 110 and one or more cockpit output devices 112. Cockpit input devices 110 and output devices 112 are positioned at or in a cockpit of the vehicle 102. The cockpit is the portion of the vehicle where the user is positioned when controlling the vehicle and/or monitoring the operation of the vehicle autonomy system 103 while the vehicle autonomy system 103 controls the vehicle 102. For example, the cockpit of the vehicle 102 may include an area of the vehicle around the steering wheel and pedals.

Cockpit output devices 112 may include one or more speakers 118, display screens 120, Light Emitting Diodes (LEDs) or other lights 122, etc. Cockpit output devices 112 provide prompts to the user including, for example, alert prompts 134 and labeling prompts 136. In some examples, the cockpit output devices 112 also provide vehicle autonomy system 103 status data to the user.

Cockpit input devices 110 may include one or more touch-sensitive displays, one or more input devices, such as a keyboard or computer mouse, one or more buttons, such as button 114, one or more audio sensors, such as microphone 116, etc.

In operation, cockpit input devices 110 receive input from the user including, for example, alert inputs and/or labeling inputs. For example, the user may actuate a button 114 to provide an alert input, which may be in response to an alert prompt 134 from the alertness monitor 104. In some examples, the user actuates the button 114 to provide labeling input 130 to the labeling system 106. Actuating the button 114 generates a labeling input 130 directly or indirectly. For example, the button 114 may indicate a particular type of labeling input (e.g., the user may be instructed to press the button 114 whenever a particular event or condition occurs). In another example, the cockpit input devices 110 include multiple buttons. The user may be instructed to select a button corresponding to a type, category, or other description of an object in the vehicle's environment. In yet another example, the user uses the button to indirectly generate a labeling input 130 by selecting the button 114 to key the microphone 116. When the microphone 116 is keyed, the user records an audio message including the labeling input 130.

The labeling system 106 receives labeling inputs 130 from one or more of the cockpit input devices 110. Labeling inputs 130 describe an object. A labeling input 130 may include different types of data in different examples. In some examples, a labeling input 130 includes an indication that a button 114 has been actuated by the user. For example, the user may actuate the button 114 every time that the user detects a certain type of object, such as an overpass, particular type of vehicle, etc. In some examples, more than one button 114 is present. The user selects different buttons to provide different labeling input 130. For example, different buttons may indicate different types or categories of objects or other descriptors of objects. In some examples, labeling input describes a desired response of the vehicle 102 to the presence of an object (e.g., slow down, stop, continue as before, take an evasive action, etc.).

The labeling system 106 processes labeling inputs 130. For example, the labeling system 106, in some examples, receives sensor data 142 captured at or around the time that a labeling input 130 is received. The sensor data 142 may include remote-sensing data received from one or more remote sensing devices, or other sensor data, such as data from an inertial measurement unit (IMU), odometer, global positioning system (GPS), encoder, etc. The labeling system 106 may incorporate labeling input 130 and sensor data 142 to form training data, for example, as training data packages. For example, some or all of a labeling input 130 may form metadata describing sensor data 142 as part of training data.

The training data may be used to train a perception system 105 of the vehicle autonomy system 140. The perception system 105 may be trained with the training data offline on a separate computing system, such as on a desktop computer using AV development software. In some examples, training data from multiple vehicles and/or from other sources are aggregated to train a perception system 105.

In some examples, the labeling system 106 performs formatting, or other processing on labeling inputs 130 before the labeling inputs 130 are merged with sensor data 142, such as remote-sensing data, to form training data packages. For example, the labeling system 106 may extract text from an audio recording included with a labeling input 130. The labeling system 106 may also analyze text including, for example, performing key word matching, performing natural language processing, etc. In some examples, the labeling system 106 generates a training data package including a labeling input, remote-sensing data from about the time of the sensor input, and an indication of an event detected at about the same time as the labeling input 130.

The user may provide a labeling input 130 spontaneously and/or in response to a labeling prompt 136. For example, if the user determines that an object is present in the environment 100 of the vehicle, the user provides a labeling input 130 without being prompted by the labeling system 106. In some examples, the labeling system 106 is notified, for example by the perception system 105, that an object has been detected and should be labeled or otherwise described by a labeling input 130. The perception system 105 may send to the training system an object alert 143 indicating that an object has been detected for labeling. In response to the object alert 143, the labeling system 106 may generate a labeling prompt 136 that is provided to a cockpit output device 112 as described herein.

In some examples, the perception system 105 is tuned to generate a covariance indicator or other descriptor of confidence in the perception system 105's classification of a detected object. If the perception system 105 cannot identify an object, or identifies an object with a low confidence that the identification is correct (e.g., below a predetermined threshold), it may prompt the labeling system 106 to send a labeling prompt 136, e.g., by sending an object alert 143. The labeling prompt 136 is provided to the user via one or more cockpit output devices 112. The labeling prompt 136 may include an audio message played by the speaker 118, a text or message or graphical indication shown at the display 120, the lighting and/or blinking of one or more lights 122, etc.

The alertness monitor 104 sends alert prompts 134 to one or more cockpit output devices 112. An alert prompt 134 may include an audio message played by the speaker 118, a text message shown at the display 120, the lighting and/or blinking of one or more lights 122, etc. In response to an alert prompt 134, the user provides an alert input 132 to the alertness monitor 104. The alert input 132, for example, is a selection of a button 114 and/or an audio message recorded at microphone 116.

The labeling system 106 and alertness monitor 104 are in communication to monitor inputs 130, 132 received from the user. For example, when the labeling system 106 receives a labeling input 130, it sends a notice message 109 to the alertness monitor 104. The notice message 109 indicates that the labeling system 106 has received a labeling input 130. In some examples, the notice message 109 includes a timestamp indicating the time that labeling input 130 was received. The alertness monitor 104 receives alert inputs 132 and notice messages 109. The alertness monitor 104 determines whether an input threshold time has passed since the last input (e.g., a labeling input 130 or an alert input 132) was received from the user. If the input threshold time has passed, the alertness monitor 104 provides an alert prompt 134 and awaits an alert input 132 responsive to the alert prompt 134. If no alert input 132 is received within a response threshold time of sending the alert prompt 134, the alertness monitor 104 may cause the vehicle autonomy system 103 to take a remedial action.

A remedial action is a change to the operation of the vehicle 102 or systems thereof prompted when the user fails to respond to an alert prompt. Example remedial actions include bringing the vehicle 102 to a safe stop and disengaging the vehicle autonomy system 103. Other example remedial actions include making changes to alertness monitor parameters such as, for example, the input threshold time, the response threshold time, the type of alert prompt provided, etc. Another remedial action includes changing the remedial action that will occur for a future instance where the user fails to respond to an alert prompt within the response threshold. For example, the first time that the user fails to respond to an alert prompt, the remedial action may include changing an alertness monitor parameter. A subsequent time that the user fails to respond to an alert prompt, the remedial action may include bringing the vehicle 102 to a safe stop, disengaging the vehicle autonomy system 103, etc. Also, in some examples, more than one remedial action is taken at a time.

In some examples, the alertness monitor 104 is also configured to implement context-dependent alert prompting. Context-dependent alert prompting may be implemented in conjunction with integrated user alert and control system data labeling or may be implemented independently. According to context-dependent alert prompting, the alertness monitor 104 is configured to modify an alertness monitor depending on the state of the vehicle 102 and the environment 100. Example alertness monitor parameters that may be changed include, whether the alertness monitor is active, the type of alert prompt 134 provided, the input threshold time, the response threshold time, the type of alert prompt expected, the type of remedial action taken in the future, etc.

The efficacy and/or desirability of receiving alert inputs 132 from the user may vary depending on the state of the vehicle 102 and/or the vehicle's environment 100. For example, if the vehicle 102 is traveling at a high rate of speed on an interstate highway, it may be desirable to frequently verify that the user is alert. On the other hand, if the vehicle 102 is traveling at a slower rate of speed, it may not be necessary and/or desirable to check as often. Also, different jurisdictions may have different requirements regarding the frequency or type of alert inputs 132 that are to be received from users of autonomous vehicles.

The alertness monitor 104, in some examples, receives vehicle status data 140 from the vehicle autonomy system 103. Vehicle status data may include data from one or more sensors and/or other data describing the status of the vehicle 102 and/or the vehicle autonomy system. In some examples, vehicle status data 140 indicates a location of the vehicle, a speed of the vehicle, a level of traffic around the vehicle, etc. In some examples, vehicle status data 140 describes a level of confidence in the vehicle's operation and/or surroundings. The alertness monitor 104 may change the frequency and/or type of alert prompts 134 in response. For example, if the vehicle autonomy system has a low level of confidence in the vehicle's operation or surroundings, alert prompts 134 may be provided more frequently and/or in a more noticeable way (e.g., a flashing light, an audio signal and a flashing light, etc.). Consider an example in which the vehicle autonomy system 103 tracks the lane accuracy of the vehicle 102. If the lane accuracy of the vehicle is poor, the alertness monitor 104 may change an alertness monitor parameter such as, for example, increasing a volume of alert prompts or decreasing the input threshold time. Vehicle status data 140 describes a status of the vehicle 102 including, for example, the state of the vehicle controls, the amount of time that has passed since the last user input 130, 132 was received, whether the vehicle lights are on, whether the vehicle autonomy system 103 is engaged, or the mode of the vehicle autonomy system 103.

The alertness monitor 104 determines, based on vehicle status data 140, whether a condition change has occurred. If a condition change has occurred, the alertness monitor 104 modifies an alertness monitor parameter. Alertness monitor parameters that may be modified include, for example, whether alert prompts 134 are sent, the type of remedial action taken if the user does not respond to an alert prompt in the response threshold time, the input threshold time, the response threshold time, the type of alert input 132 received, or the type of alert prompt 134 provided.

In some examples, the alertness monitor 104 selectively engages or disengages, for example, based on the type of roadway that the vehicle 102 is traversing, the location of the vehicle 102, the time of day, or any other sensor data or vehicle status condition. When the alertness monitor 104 is disengaged, it may not provide alert prompts 134 and/or record alert inputs 132.

Also, in some examples, the alertness monitor 104 modifies the format of alert prompts 134 and/or alert inputs 132 for different conditions. In some examples, the frequency of alert prompts 134 is modified. For example, if the vehicle 102 is on an interstate highway or otherwise traveling above a threshold vehicle speed, the input threshold time may be reduced, thus increasing the frequency of alert prompts. Also, in some examples, the volume of alert prompts may be modified. For example, alert prompts 134 provided as audible sounds or messages may become louder if the vehicle 102 is traveling at a high speed or if ambient noise conditions in the cockpit are loud. In some examples, the type of alert prompts 134 may be modified. For example, an alert prompt may be provided by flashing lights 122 in some conditions and by an audible sound or messages in other conditions.

In some examples, the alertness monitor 104 and labeling system 106 are components of the vehicle autonomy system 103. In other examples, the alertness monitor 104 and labeling system 106 are separate systems. In some examples, some or all of the alertness monitor 104, the labeling system 106, and the vehicle autonomy system 103 are incorporated into one or more vehicle systems or subsystems.

Figure 2:
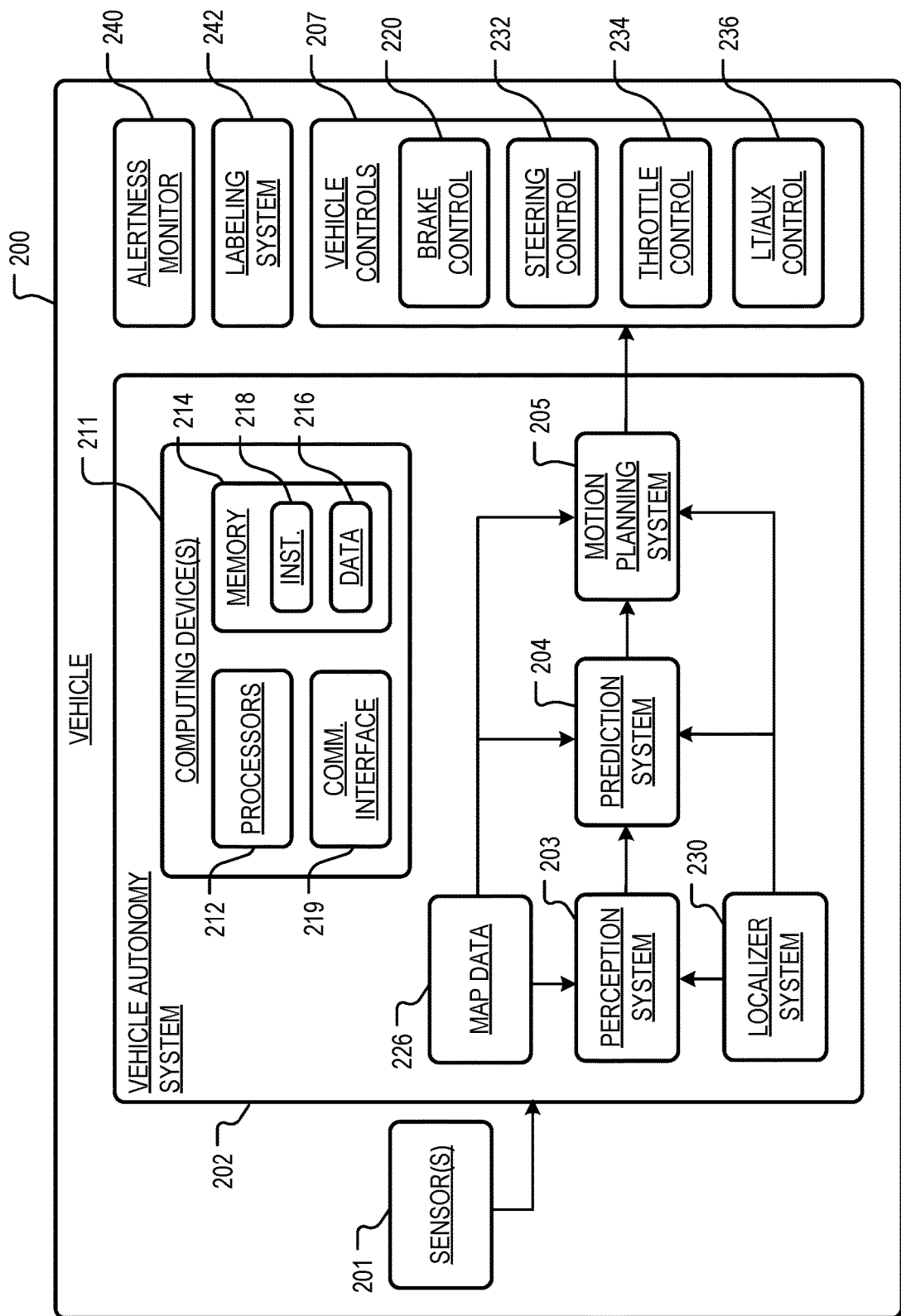
FIG. 2 depicts a block diagram of an example vehicle according to example aspects of the present disclosure.

FIG. 2 depicts a block diagram of an example vehicle 200 according to example aspects of the present disclosure. Vehicle 200 can be, for example, an autonomous or semi-autonomous vehicle. The vehicle 200 includes one or more sensors 201, a vehicle autonomy system 202, and one or more vehicle controls 207. In some examples, the vehicle 200 includes an alertness monitor 240 and labeling system 242, which may operate in a manner similar to that of the alertness monitor 104 and labeling system 106 described in FIG. 1.

The vehicle autonomy system 202 can be engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate motion path through the environment. The vehicle autonomy system 202 can control the one or more vehicle controls 207 to operate the vehicle 200 according to the motion path.

The vehicle autonomy system 202 includes a perception system 203, a prediction system 204, a motion planning system 205, and a localizer system 230 that cooperate to perceive the surrounding environment of the vehicle 200 and determine a motion plan for controlling the motion of the vehicle 200 accordingly. The localizer system 230 may be arranged to operate as described herein.

Various portions of the autonomous vehicle system 202 receive sensor data from the one or more sensors 201. For example, the sensors 201 may include remote detection sensors as well as motion sensors such as an inertial measurement unit (IMU), one or more encoders, one or more odometers, etc. The sensor data can include information that describes the location of objects within the surrounding environment of the vehicle 200, information that describes the motion of the vehicle, etc.

The sensors 201 may also include one or more remote detection sensors or sensor systems, such as a LIDAR, a RADAR, one or more cameras, etc. As one example, a LIDAR system of the one or more sensors 201 generates sensor data (e.g., remote detection sensor data) that includes the location (e.g., in three-dimensional space relative to the LIDAR system) of a number of points that correspond to objects that have reflected a ranging laser. For example, the LIDAR system can measure distances by measuring the Time of Flight (TOF) that it takes a short laser pulse to travel from the sensor to an object and back, calculating the distance from the known speed of light.

As another example, for a RADAR system of the one or more sensors 201 generates sensor data (e.g., remote detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, one or more cameras of the one or more sensors 201 may generate sensor data (e.g., remote detection sensor data) including still or moving images. Various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in image or images captured by the one or more cameras. Other sensor systems can identify the location of points that correspond to objects as well.

As another example, the one or more sensors 201 can include a positioning system. The positioning system can determine a current position of the vehicle 200. The positioning system can be any device or circuitry for analyzing the position of the vehicle 200. For example, the positioning system can determine a position by using one or more of inertial sensors, a satellite positioning system such as a Global Positioning System (GPS), based on IP address, by using triangulation and/or proximity to network access points or other network components (e.g., cellular towers, WiFi access points, etc.) and/or other suitable techniques. The position of the vehicle 200 can be used by various systems of the vehicle autonomy system 202.

Thus, the one or more sensors 201 can be used to collect sensor data that includes information that describes the location (e.g., in three-dimensional space relative to the vehicle 20) of points that correspond to objects within the surrounding environment of the vehicle 200. In some implementations, the sensors 201 can be located at various different locations on the vehicle 200. As an example, in some implementations, one or more cameras and/or LIDAR sensors can be located in a pod or other structure that is mounted on a roof of the vehicle 200 while one or more RADAR sensors can be located in or behind the front and/or rear bumper(s) or body panel(s) of the vehicle 200. As another example, camera(s) can be located at the front or rear bumper(s) of the vehicle 200 as well. Other locations can be used as well.

The localizer system 230 receives some or all of the sensor data from sensors 201 and generates vehicle poses for the vehicle 200. A vehicle pose describes the position and attitude of the vehicle. The position of the vehicle 200 is a point in a three dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis and a roll about a second horizontal axis. In some examples, the localizer system 230 generates vehicle poses periodically (e.g., every second, every half second, etc.) The localizer system appends time stamps to vehicle poses, where the time stamp for a pose indicates the point in time that is described by the pose. The localizer system 230 generates vehicle poses by comparing sensor data to map data 226 describing the surrounding environment of the vehicle 200. The localizer system 230 may include one or more localizers that generate pose estimates by matching remote-sensing data to map data. The localizer system 230 may also include a pose filter that receives pose estimates from the one or more localizers and generates vehicle poses based on the pose estimates and based on motion sensor data from one or more motion sensors such as an inertial measurement unit (IMU), various encoders, various odometers, etc.

The perception system 203 detects objects in the surrounding environment of the vehicle 200 based on sensor data, map data 226 and/or vehicle poses provided by the localizer system 230. Map data 226, for example, may provide detailed information about the surrounding environment of the vehicle 200. The map data 226 can provide information regarding: the identity and location of different roadways, segments of roadways, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway; traffic control data (e.g., the location and instructions of signage, traffic lights, or other traffic control devices); and/or any other map data that provides information that assists the vehicle autonomy system 202 in comprehending and perceiving its surrounding environment and its relationship thereto. A roadway may be a place where the vehicle can drive and may include, for example, a road, a street, a highway, a lane, a parking lot, a driveway, etc. The perception system 203 may utilize vehicle poses provided by the localizer system 230 to place the vehicle 200 within the map data and thereby predict which objects should be in the vehicle 200's surrounding environment.

In some examples, the perception system 203 determines state data for one or more of the objects in the surrounding environment of the vehicle 200. State data may describe a current state of an object (also referred to as features of the object). The state data for each object describes, for example, an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the vehicle 200; minimum path to interaction with the vehicle 200; minimum time duration to interaction with the vehicle 200; and/or other state information.

In some implementations, the perception system 203 can determine state data for each object over a number of iterations. In particular, the perception system 203 can update the state data for each object at each iteration. Thus, the perception system 203 can detect and track objects, such as vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 can generate prediction data associated with one or more of the objects detected by the perception system 203. In some examples, the prediction system 204 generates prediction data describing each of the respective objects detected by the perspective system 204.

Prediction data for an object can be indicative of one or more predicted future locations of the object. For example, the prediction system 204 may predict where the object will be located within the next 5 seconds, 20 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that particular object (e.g., an object classified as a vehicle) approaching an intersection and maneuvering into a left-turn lane intends to turn left. In such a situation, the prediction system 204 can predict a trajectory (e.g., path) corresponding to a left-turn for the vehicle such that the vehicle turns left at the intersection. Similarly, the prediction system 204 can determine predicted trajectories for other objects, such as bicycles, pedestrians, parked vehicles, etc. The prediction system 204 can provide the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 determines a motion plan for the vehicle 200 based at least in part on the predicted trajectories associated with the objects within the surrounding environment of the vehicle, the state data for the objects provided by the perception system 203, vehicle poses provided by the localizer system 230, and/or map data 226. Stated differently, given information about the current locations of objects and/or predicted trajectories of objects within the surrounding environment of the vehicle 20, the motion planning system 205 can determine a motion plan for the vehicle 200 that best navigates the vehicle 200 relative to the objects at such locations and their predicted trajectories on acceptable roadways.

In some implementations, the motion planning system 205 can evaluate one or more cost functions and/or one or more reward functions for each of one or more candidate motion plans for the vehicle 200. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate pathway. The motion planning system 205 can select or determine a motion plan for the vehicle 200 based at least in part on the cost function(s) and the reward function(s). For example, the motion plan that minimizes the total cost can be selected or otherwise determined. The motion plan can be, for example, a path along which the vehicle 200 will travel in one or more forthcoming time periods. In some implementations, the motion planning system 205 can be configured to iteratively update the motion plan for the vehicle 200 as new sensor data is obtained from one or more sensors 201. For example, as new sensor data is obtained from one or more sensors 201, the sensor data can be analyzed by the perception system 203, the prediction system 204, and the motion planning system 205 to determine the motion plan.

Each of the perception system 203, the prediction system 204, the motion planning system 205, and the localizer system 230, can be included in or otherwise a part of a vehicle autonomy system configured to determine a motion plan based at least in part on data obtained from one or more sensors 201. For example, data obtained by one or more sensors 201 can be analyzed by each of the perception system 203, the prediction system 204, and the motion planning system 205 in a consecutive fashion in order to develop the motion plan. While FIG. 2 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

The motion planning system 205 can provide the motion plan to one or more vehicle control systems 207 to execute the motion plan. For example, the one or more vehicle control systems 207 can include throttle systems, brake systems, steering systems, and other control systems, each of which can include various vehicle controls (e.g., actuators or other devices that control gas flow, steering, braking, etc.) to control the motion of the vehicle. The various control systems 207 can include one or more controllers, control devices, motors, and/or processors.

The vehicle control systems 207 can include a brake control module 220. The brake control module 220 is configured to receive a braking command from the vehicle autonomy system 202 (e.g., from the motion planning system 205), and in response, brake the vehicle 200. In some examples, the brake control module 220 includes a primary system and a secondary system. The primary system may receive braking commands and, in response, brake the vehicle 200. The secondary system may be configured to determine a failure of the primary system to brake the vehicle 200 in response to receiving the braking command.

A steering control system 232 is configured to receive a steering command from the vehicle autonomy system 202 (e.g., from the motion planning system 205) and, in response provide a steering input to steer the vehicle 200. A throttle control system 234 is configured to receive a throttle command from the vehicle autonomy system (e.g., from the motion planning system 205) and, in response provide a throttle input to control the engine or other propulsion system of the vehicle 200. A lighting/auxiliary control module 236 may receive a lighting or auxiliary command. In response, the lighting/auxiliary control module 236 may control a lighting and/or auxiliary system of the vehicle 200. Controlling a lighting system may include, for example, turning on, turning off, or otherwise modulating headlines, parking lights, running lights, etc. Controlling an auxiliary system may include, for example, modulating windshield wipers, a defroster, etc.

The vehicle autonomy system 202 includes one or more computing devices, such as the computing device 211, which may implement all or parts of the perception system 203, the prediction system 204, the motion planning system 205 and/or the localizer system 230. The example computing device 211 can include one or more processors 212 and one or more memory devices (collectively referred to as memory) 214. The one or more processors 212 can be any suitable processing device (e.g., a processor core, a microprocessor, an Application Specific Integrated Circuit (ASIC), a Field Programmable Gate Array (FPGA), a microcontroller, etc.) and can be one processor or a plurality of processors that are operatively connected. The memory 214 can include one or more non-transitory computer-readable storage mediums, such as Random Access Memory (RAM), Read Only Memory (ROM), Electrically Erasable Programmable Read Only Memory (EEPROM), Erasable Programmable Read Only Memory (EPROM), flash memory devices, magnetic disks, etc., and combinations thereof. The memory 214 can store data 216 and instructions 218 which can be executed by the processor 212 to cause the vehicle autonomy system 202 to perform operations. The one or more computing devices 211 can also include a communication interface 219, which can allow the one or more computing devices 211 to communicate with other components of the vehicle 200 or external computing systems, such as via one or more wired or wireless networks. Additional descriptions of hardware and software configurations for computing devices, such as the computing device(s) 211 are provided herein at FIGS. 8 and 9.

Figure 3:
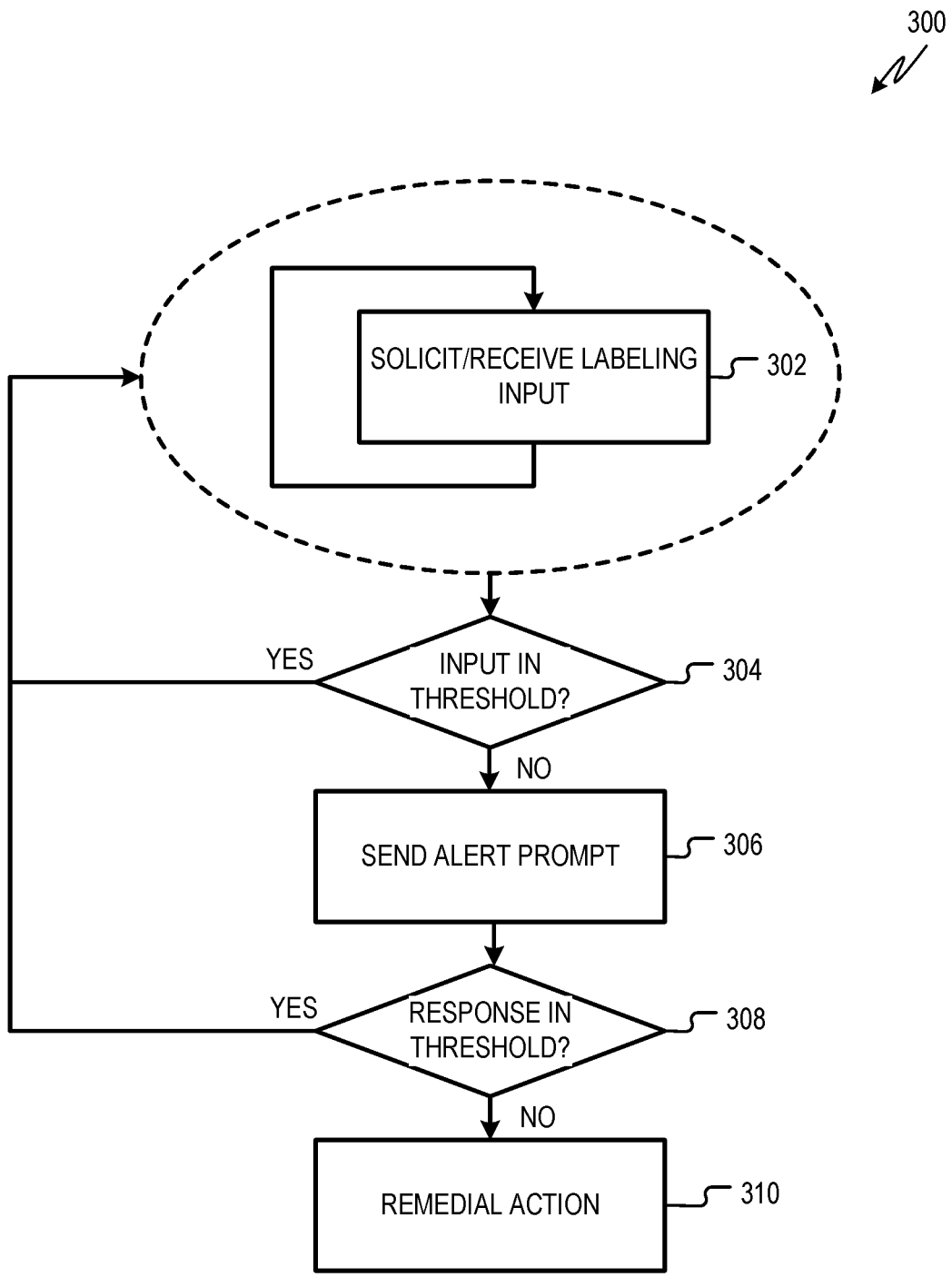
FIG. 3 is a flowchart showing one example of a process flow that may be executed by the alertness monitor to implement integrated user alert and vehicle autonomy system training.

FIG. 3 is a flowchart showing one example of a process flow 300 that may be executed by an autonomous vehicle (e.g., an alertness monitor and/or labeling system) to implement integrated user alert and vehicle autonomy system training. At operation 302, the labeling system executes a cycle of soliciting and/or receiving labeling inputs from the user. The labeling system receives labeling inputs from the user at appropriate times. As described herein, labeling inputs may be prompted or unprompted. The user provides an unprompted labeling input using a cockpit input device, for example, if the user notices an object that the user believes could be used to later train the vehicle autonomy system. The user provides a prompted labeling input using a cockpit input device, for example, when the labeling system determines that an object in the field-of-view of the vehicle's sensors should be labeled.

At operation 304, the alertness monitor determines if an input threshold time has passed since the last input was received from the user. The alert system identifies the last-received input. For example, the alertness monitor keeps data describing when the last alert input was received. Also, the alertness monitor receives a notice message from the labeling system when the labeling system receives a labeling input. The notice message indicates that the labeling system has received a labeling input. The alertness monitor identifies the last received input by examining the data describing the last alert input (if any) and data describing the last notice message was received from the labeling system. In some examples, the operation 304 is performed by the alertness monitor periodically, for example, once per the input threshold time. For example, the alertness monitor may be programmed to "wake up" periodically and execute operation 304.

If the last received input was received within the input threshold time, then the autonomous vehicle (e.g., the labeling system thereof) continues to solicit and/or receive labeling input at operation 302. If the last received input was not received within the input threshold time, the alertness monitor sends an alert prompt at operation 306. At operation 308, the alertness monitor determines if an alert input is received in response to the alert prompt within a response threshold time. The response threshold time used at operation 308 may be the same as the input threshold time used at operation 304 or different. Also, in some examples, the alertness monitor also considers a labeling input to be a response to the alert prompt. For example, the alertness monitor may determine that the user has responded to the alert prompt if it receives a notice message from the labeling system indicating that a labeling input was received within the response threshold time of the alert prompt.

If, at operation 308, a response was received within the response threshold time, then vehicle continues to solicit and/or receive labeling inputs at operation 302. If no response was received within the response threshold time, then the alertness monitor takes a remedial action at operation 310. Any suitable remedial action may be performed. Example remedial actions include disengaging the vehicle autonomy system and stopping the vehicle (e.g., by pulling the vehicle to a safe stopping spot). In some examples, the remedial action includes changing an alertness monitor parameter such as the input threshold time, the response threshold time, a form of the alert prompt, etc. For example, if the user fails to respond within the response threshold time, the alertness monitor may decrease the input threshold time, decrease the response threshold time, and/or increase the intensity of the alert prompt format, e.g., by adding to the number of cockpit output devices used, adding to the volume of cockpit output devices used, changing the way that a cockpit output device is used, changing the volume or brightness of a cockpit output device, etc. For example, if the alert prompt provided at operation 306 included blinking a yellow light, increasing the intensity of the alert prompt format may include, for example, blinking additional lights, causing the light to blink a different color (e.g., red), causing an audible alert to accompany the blinking light, etc.

Figure 4:
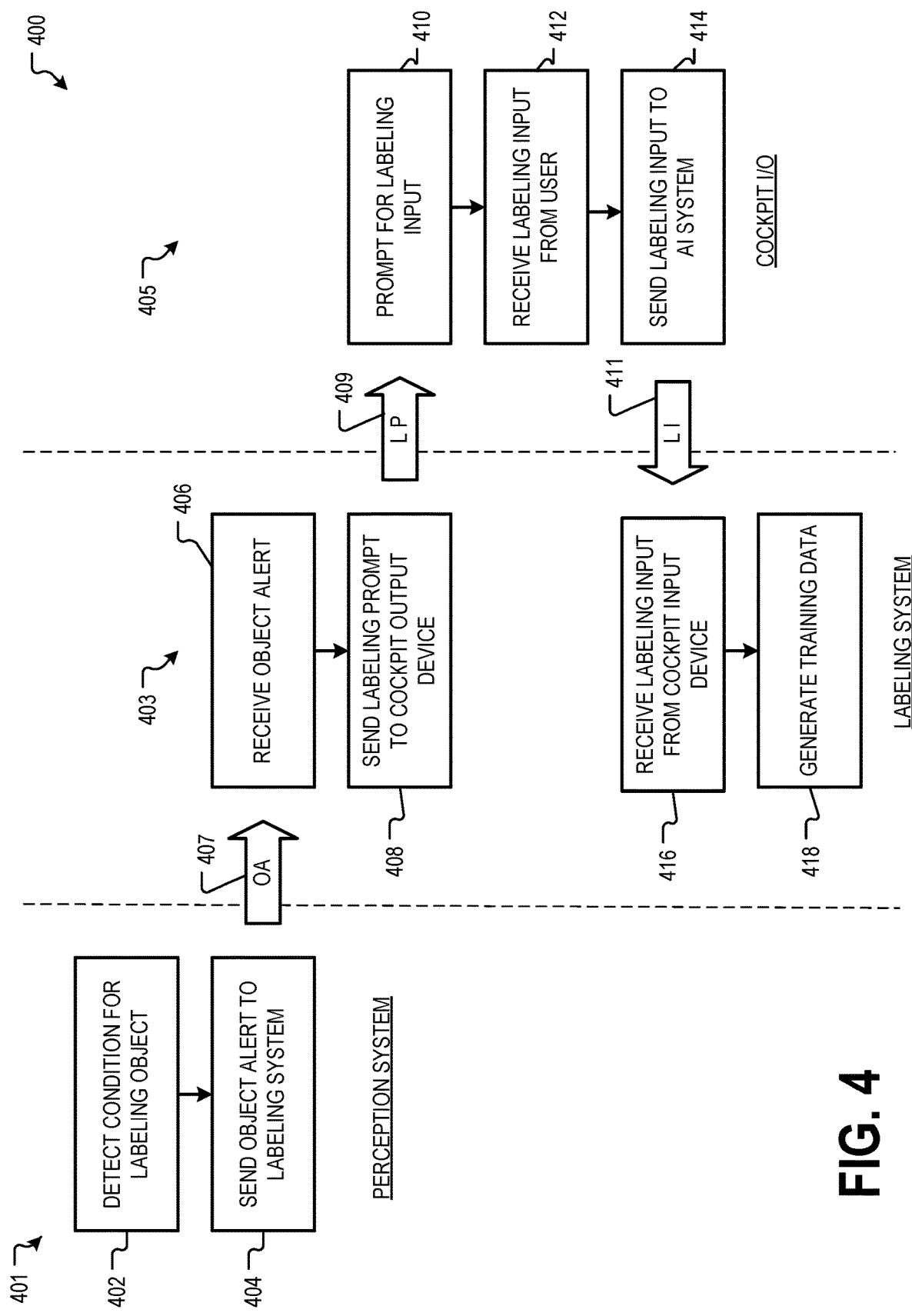
FIG. 4 is a flowchart showing one example of a process flow that may be executed by the vehicle autonomy system, the training system, and one or more cockpit input/output (I/O) devices to train the vehicle autonomy system.

FIG. 4 is a flowchart showing one example of a process flow 400 that may be executed by the vehicle autonomy system (e.g., perception system), the training system, and one or more cockpit input/output (I/O) devices to generate training data for training the vehicle autonomy system. The process flow 400 includes three columns 401, 403, 405 that correspond to operations executed by different components of an autonomous vehicle. Column 401 shows operations executed by a perception system. Column 403 shows operations executed by a labeling system. Column 405 shows operations executed by cockpit input devices and/or cockpit output devices.

At operation 402, the perception system detects an object labeling condition. The perception system may detect such a condition in various ways. In some examples, the perception system executes one or more machine learning algorithms that relate remote-sensing data to known objects and object parameters, such as object speed, object trajectory, etc. In some examples, the machine learning algorithm generates a covariance indicator associated with detected objects, where the covariance indicator describes a level of confidence that the object and/or metadata describing the object, such as its trajectory, etc., have been correctly identified. The perception system may detect an object labeling condition if the level of confidence in the perception system's identification of an object and/or the identification of object parameters, such as speed, trajectory, etc., is below a threshold confidence level.

At operation 404, the perception system sends an object alert 407 to the labeling system. The object alert 407 includes an indication that an object labeling condition has occurred. In some examples, the object alert 407 includes other data describing the object labeling condition. For example, the object alert 407 may include remote-sensing data indicating the object to be identified, such as a LIDAR point cloud or optical image with a graphical overlay (e.g., a box or oval) that highlights an object to be labeled.

The labeling system receives the object alert 407 at operation 406 and sends a labeling prompt 409 to a cockpit I/O device at operation 408. For example, the labeling prompt 409 may be sent to a cockpit output device such as a speaker, display, light, etc. Also, in some example, the labeling prompt 409 also includes remote-sensing data indicating the object to be labeled.

The cockpit I/O device receives the labeling prompt 409 at operation 410 and generates a perceptible indication of the labeling prompt at operation 410. This may include, for example, blinking a light or lights at the cockpit, causing a speaker to make a suitable noise, causing a display to display information about the labeling prompt or object to be labeled, etc. In some examples, more than one output device may be used. For example, generating the perceptible indication of the labeling prompt may include blinking a light and providing information at a display. Information provided at the display may include a representation of the remote sending data including the object to be labeled. For example, the display may show an image, LIDAR point cloud, or other representation with the object to be labeled outlined, highlighted, or otherwise indicated.

At operation 412, the cockpit I/O device receives labeling input from the user. For example, the user may provide labeling input by pushing one or more buttons or other switches, by speaking a description of the object to a microphone or other audio sensor, etc. The labeling input describes the object and/or an object parameter. In some examples, the labeling input describes a vehicle control input, for example, a vehicle control input that should be provided in response to the object with a given set of object parameters. For example, if the object is a plastic bag, the vehicle control input may indicate that the vehicle should maintain its current direction and speed. If the object is a pedestrian in the path of the vehicle, the vehicle control input may call for application of the brakes and/or an evasive maneuver. At operation 414, the labeling input 411 received by the relevant cockpit I/O device or devices is provided to the labeling system. The labeling system receives the labeling input 411 at operation 416.

At operation 418, the labeling system generates training data. For example, the labeling system may utilize all or part of the labeling input 411 to generate metadata that is associated with remote-sensing data. The metadata includes the indication of object identity and/or object parameters indicated by the user. The metadata may also include a pointer or other reference to the portions of remote-sensing data where the object appears such as, for example, a frame or frames of a video, a point or points of a LIDAR point cloud, etc. In some examples, generating the training data may also include processing parts or all of the labeling input. For example, the labeling system may perform voice recognition to extract text data or other data indicating words spoken by the user. The text data may be appended to the remote-sensing data to generate training data.

FIG. 4 describes an example in which the perception system determines that an object should be labeled. In some examples, the user provides labeling input unprompted. For example, the user may provide an unprompted or unsolicited labeling input if the user sees or otherwise perceives an object or condition that the user determines should be the subject of training data. For example, if the observes the vehicle reacting unexpectedly to an object or condition, the user may generate a labeling input unprompted. In examples in which the user provides unsolicited or unprompted labeling inputs, the labeling system and cockpit I/O devices may operate as described by the process flow 400, albeit beginning at operation 412.

Figure 5:
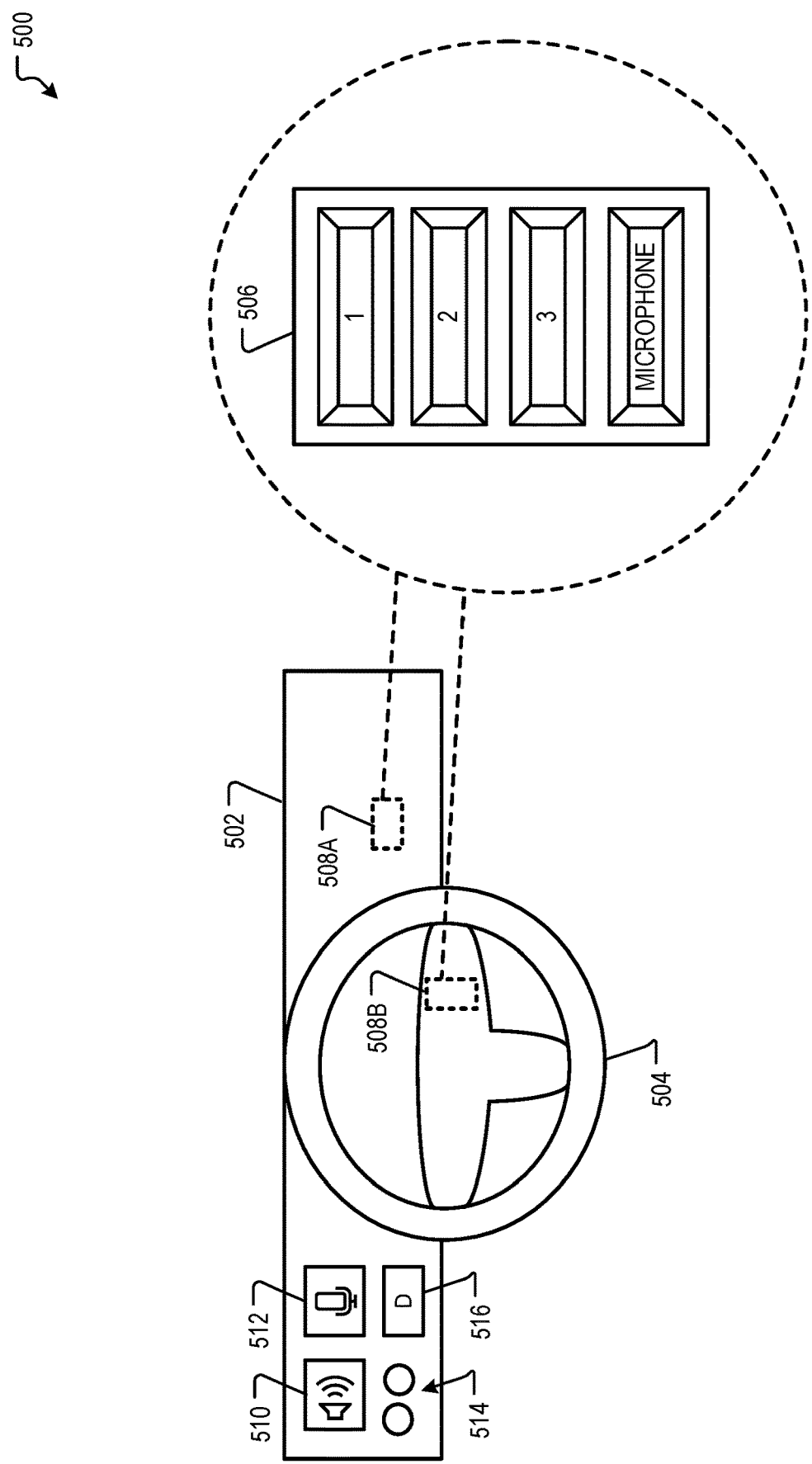
FIG. 5 is a diagram showing a portion of the vehicle cockpit and illustrating example positions and forms for various cockpit I/O devices.

FIG. 5 is a diagram showing a portion 500 of the vehicle cockpit and illustrating example positions and forms for various cockpit I/O devices. The portion 500 includes a dashboard 502. The user sits behind the dashboard 502. For example, the user views the dashboard 502 from the perspective shown in FIG. 5. The dashboard 502 includes a steering wheel 504. The user uses the steering wheel 504 to provide steering control to the vehicle, for example, when the vehicle autonomy is fully or partially disengaged. In some examples, the steering wheel is omitted, for example, if the user is not to provide steering input during the operation of the vehicle.

The dashboard 502 illustrates example positions for one or more cockpit input devices and/or cockpit output devices. A microphone 512, speaker 510, lights 514, and display 516 are shown on the dashboard 502. A button set 506 is positioned at a location that is easily-reachable by the user while the vehicle is operating. FIG. 5 shows two example positions for the button set 506 including position 508A on the dashboard 502 position 508B on the steering wheel 504.

In the example of FIG. 5, the button set 506 includes four buttons labeled "1," "2," "3," and "Microphone," although more or fewer buttons, including different combinations of buttons, may be used in some examples. The users selects the "Microphone" button to key the microphone 512 to receive a labeling input or other input. The user selects one of buttons "1," "2," or "3" to provide labeling input. For example, buttons "1," "2," and "3" may correspond to labeling inputs of different types (e.g., different labeling input types). In one example, the different buttons indicate differing levels of severity indicated by an object to be identified. For example, button "1" may correspond to objects that are interesting to the user; button "2" corresponds to objects that indicate a potential accident; and button "3" corresponds to objects that indicate a very serious condition. In some examples, the labeling system provides a labeling alert if the vehicle autonomy system disengages. Buttons "1," "2," and "3" may correspond to different reasons for the disengage including, for example, a map error, a perception system error, etc.

Lights 514 may illuminate, blink, change color, etc. to indicate a labeling and/or alert prompt. Similarly, the display 516 may block, change color, illuminate, and/or change to indicate a labeling and/or alert prompt. In some examples, the display 516 displays a representation of the remote-sensing data indicating an object to be labeled. For example, the display 516 may display a LIDAR point cloud and/or image data, as well as graphical overlays that represent the output of a component of the autonomous vehicle system, such as the perception system. As an illustrative example, the display 516 can include an LED display, such as a tablet computing device, that displays a video feed captured from a camera of the AV and color-coded bounding boxes displayed around the objects that the perception system has detected and classified. For example, cars and trucks may be bounded in a blue box, motorcycles in a red box, pedestrians in a green box, bicyclists in a yellow box, and unknown objects in a purple box.

In operation, the 516 is configured to receive input from the user to select an object and change the color of the bounding box to label the sensor data with the correct label. For example, the user may select one of buttons "1," "2," or "3" to label a car, truck, or motorcycle. Additionally or alternatively, the user may select an object in the video feed that is not classified and then select the size and color of the bounding box to add labeling data. User input received in this manner can be provided to the labeling system, such as the labeling system 106 of FIG. 1.

The speaker 510 and microphone 512 are positioned within audio range of the user to provide audio signals that the user can hear (e.g., the speaker 510) and to receive audio input from the user (e.g., microphone 512). Although these components are shown on the dashboard 502, they may be positioned in other suitable positions in the cab in addition to or instead of on the dashboard as shown. Also, it will be appreciated that the I/O device positions shown in FIG. 5 are examples, and that I/O devices may be provided in various other suitable positions in the cab in addition to or instead of what is shown. Also, some cabs include numbers and/or combinations of I/O devices different than what is shown in FIG. 5.

Figure 6:
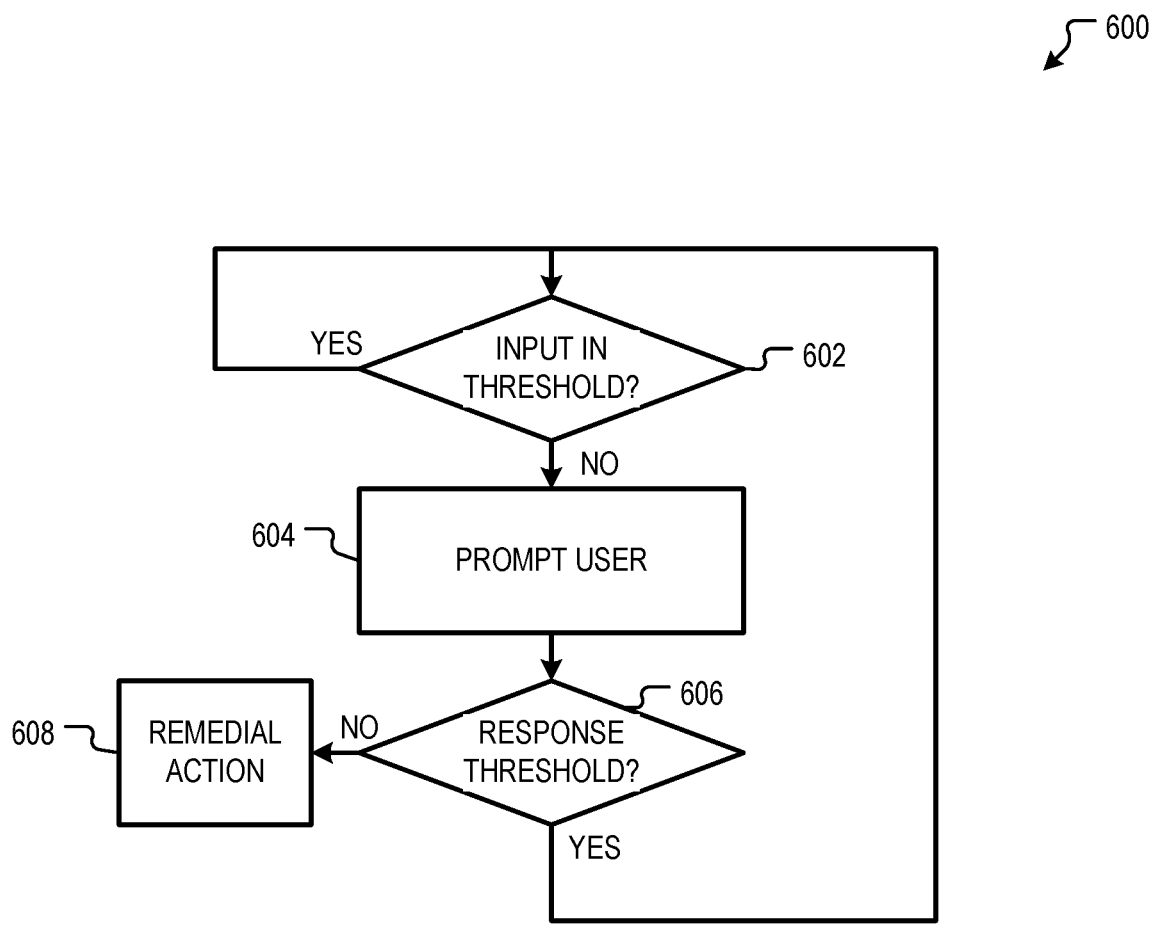
FIG. 6 is a flowchart showing one example of a process flow that may be executed by the alertness monitor for providing an alert prompt and processing alert input.

FIG. 6 is a flowchart showing one example of a process flow 600 that may be executed by the alertness monitor for providing an alert prompt and processing alert input. At operation 602, the alertness monitor determines if the user has provided a user input within an input threshold time. The alertness monitor may check for alert inputs only (e.g., whether there has been an alert input within the threshold time) or for alert or other types of inputs (e.g., whether there has been an alert input or other suitable input within the threshold time). If an input has been received within the input threshold time, the alertness monitor may return to operation 602 and continue to determine whether an input has been received within the threshold time. For example, the alertness monitor may execute the operation 602 periodically (once per instance of the threshold time).

If no input has been received within the threshold time, the alertness monitor sends an alert prompt to the user at operation 604. At operation 606, the alertness monitor determines if an input is received within a response threshold time of the prompt at operation 604. If an input is received within the response threshold time, the alertness monitor returns to operation 602 (e.g., return to periodically executing the operation 602 as described). If no input is received within the threshold time, then alertness monitor prompts a remedial action at operation 608.

Figure 7:
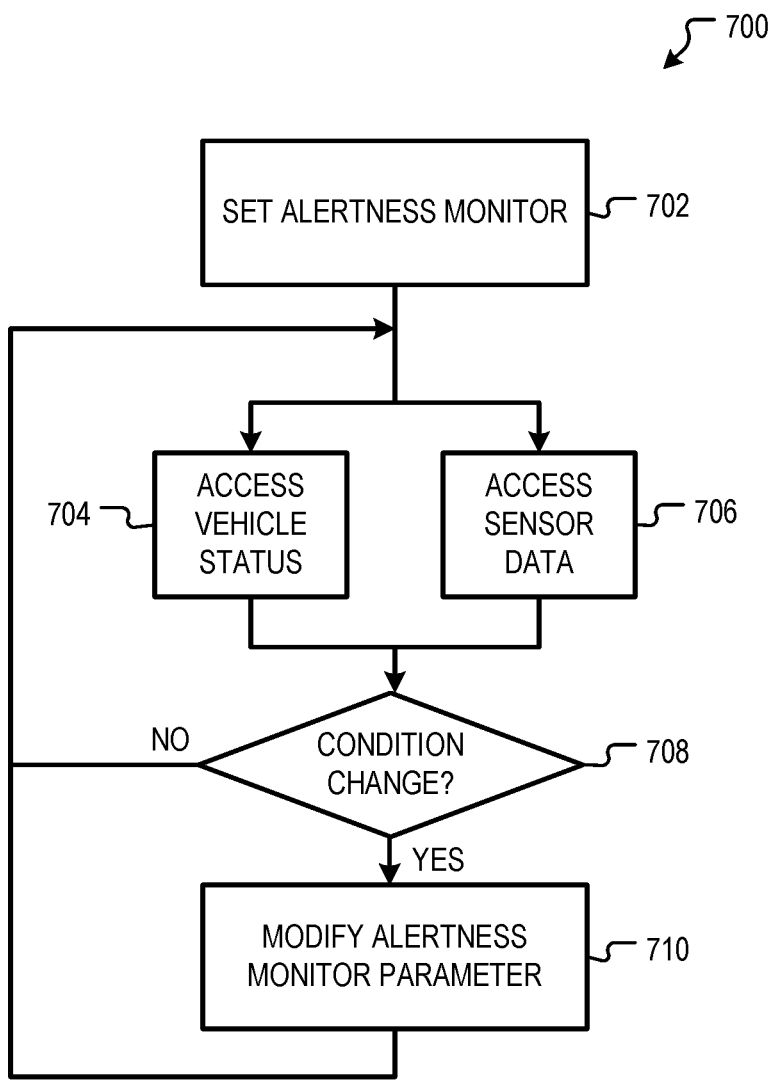
FIG. 7 is a flowchart showing one example of a process flow that may be executed by the alertness monitor to implement context-dependent alert prompting.

FIG. 7 is a flowchart showing one example of a process flow 700 that may be executed by the alertness monitor to implement context-dependent alert prompting. At operation 702, the alertness monitor is set. For example, the alertness monitor is set to a particular set of parameter. Alertness monitor parameters include, for example, whether the system is active, the type of expected alert input (e.g., button press, audio message, etc.), the input threshold time, the response threshold time, a form of the alert prompt, etc.

At operation 704 and 706, the alertness monitor receives vehicle status data (operation 704) and sensor data (operation 706). Vehicle status data and sensor data are collectively referred to herein as vehicle data. Referring to operation 704, vehicle status data can include any data describing the vehicle. In some examples, vehicle status data includes a state of the vehicle autonomy system. For example, a vehicle autonomy system may be engaged in a fully autonomous mode, engaged in a semi-autonomous mode, or disengaged. Vehicle status data may also include a location of the vehicle, such as the jurisdiction where the vehicle is present (e.g., country, state, city, etc.). In some examples, vehicle status data includes a type of roadway where the vehicle is driving such as, for example, a divided highway, a three-lane road, a two-lane road, etc. In some examples, vehicle status data includes a speed limit on the roadway where the vehicle is driving.

Referring to operation 706, sensor data include data describing the vehicle and/or the environment around the vehicle. For example, sensor data may indicate the number of other vehicles around the vehicle, the presence or absence of objects around the vehicle, etc. In some examples, one of operations 704 and 706 is omitted. Also, in the example of FIG. 7, operations 704 and 706 are performed in parallel. In some examples, operations 704 and 706 are executed sequentially.

At operation 708, the alertness monitor determines if an alertness condition of the vehicle has changed. An alertness condition changes if the status of the vehicle and/or the environment around the vehicle has changed in a manner that calls for a change to the alertness monitor parameters. The change in alertness condition, if present, is indicated by the vehicle status data and/or the vehicle sensor data. If no alertness condition change has occurred, the alertness monitor returns to operation 704 and/or operation 706.

Example alertness condition changes include, for example, the vehicle moving from a geographic position in one jurisdiction to a geographic position in another jurisdiction, the vehicle moving from a geographic position on one type of roadway to a geographic position on another type of roadway, a change in the time of day, one or more objects entering and/or exiting a vicinity of the vehicle, etc.

Other example alertness condition changes include changes to the performance of the vehicle autonomy system, or other vehicle system. For example, sensor data may indicate a measure of how well the vehicle autonomy system is controlling the vehicle, such as a lane accuracy. If the vehicle autonomy system's control of the vehicle changes (e.g., lane accuracy declines or improves), the alertness system may modify alertness system parameters accordingly. For example, increased vehicle autonomy system performance may correspond to longer input threshold and/or response threshold times, less intense alert prompts, etc.

In some examples, an alertness condition can change based on previous states of the alertness monitor. For example, if the user fails to respond to an alert prompt within the response threshold time, this may indicate an alertness condition change. The alertness system can modify an alertness condition in response, for example, by decreasing the input threshold time, decreasing the response threshold time, changing a type of future alert prompts, changing a type of expected alert inputs, etc.

If an alertness condition change has occurred, the alertness monitor modifies one or more alertness monitor parameters at operation 710. The alertness monitor parameter modified depends on the condition. In some examples, the alertness monitor assumes different parameters for different jurisdictions. For example, some jurisdictions may require operation of the alertness monitor and/or records generated by the alertness monitor while others do not. The alertness monitor is active when the vehicle is in a jurisdiction that requires operation of the alertness monitor and inactive when the vehicle is in other jurisdictions. Accordingly, an alertness condition change occurs when the vehicle moves from a jurisdiction with one set of requirements for alertness monitor parameters to another jurisdiction with a different set of requirements for alertness monitor parameters.

In another example, different alertness monitor parameters may be desirable (and/or required by a particular jurisdiction) depending on the type of roadway traversed by the vehicle. For example, the alertness monitor may use a shorter input response threshold time and/or response threshold time for divided highways where the user is more prone to lose focus and longer input and/or response threshold times on busy city streets where the environment is more likely to hold the user's attention. Also, in some examples, the alertness monitor may provide louder alert prompts on roadways with louder noise levels. For example, the engine of the vehicle may work harder (and therefore make more noise) to propel the vehicle at 65 miles per hour on a divided highway, which may cause the alertness monitor to increase the volume of alert prompts. Accordingly, an alertness condition change may occur when the vehicle transitions from one road type to another.

In another example, different alertness monitor parameters may be desirable (and/or required by a particular jurisdiction) based on vehicle conditions that could also be sensed by the user. For example, if the ambient noise level in the cockpit is above a threshold level, the alert prompts may be provided at a higher intensity, such as at a higher volume.

Figure 8:
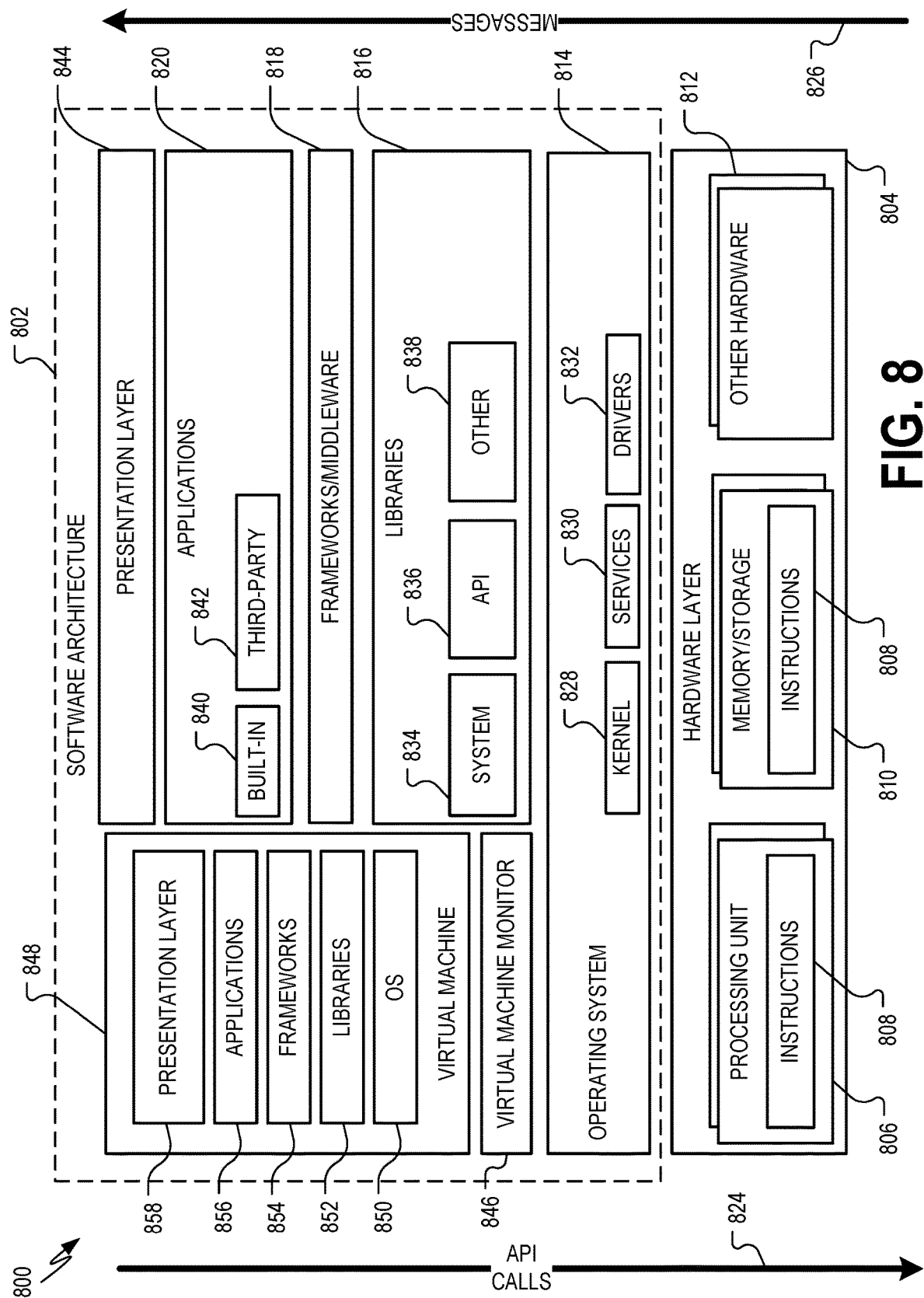
FIG. 8 is a block diagram showing one example of a software architecture for a computing device.

FIG. 8 is a block diagram 800 showing one example of a software architecture 802 for a computing device. The software architecture 802 may be used in conjunction with various hardware architectures, for example, as described herein. FIG. 8 is merely a non-limiting example of a software architecture 802 and many other architectures may be implemented to facilitate the functionality described herein. A representative hardware layer 804 is illustrated and can represent, for example, any of the above-referenced computing devices. In some examples, the hardware layer 804 may be implemented according to an architecture 900 of FIG. 9 and/or the architecture 802 of FIG. 8.

The representative hardware layer 804 comprises one or more processing units 806 having associated executable instructions 808. The executable instructions 808 represent the executable instructions of the software architecture 802, including implementation of the methods, modules, components, and so forth of FIGS. 1-7. The hardware layer 804 also includes memory and/or storage modules 810, which also have the executable instructions 808. The hardware layer 804 may also comprise other hardware 812, which represents any other hardware of the hardware layer 804, such as the other hardware illustrated as part of the architecture 900.

In the example architecture of FIG. 8, the software architecture 802 may be conceptualized as a stack of layers where each layer provides particular functionality. For example, the software architecture 802 may include layers such as an operating system 814, libraries 816, frameworks/middleware 818, applications 820, and a presentation layer 844. Operationally, the applications 820 and/or other components within the layers may invoke API calls 824 through the software stack and receive a response, returned values, and so forth illustrated as messages 826 in response to the API calls 824. The layers illustrated are representative in nature and not all software architectures have all layers. For example, some mobile or special-purpose operating systems may not provide a frameworks/middleware 818 layer, while others may provide such a layer. Other software architectures may include additional or different layers.

The operating system 814 may manage hardware resources and provide common services. The operating system 814 may include, for example, a kernel 828, services 830, and drivers 832. The kernel 828 may act as an abstraction layer between the hardware and the other software layers. For example, the kernel 828 may be responsible for memory management, processor management (e.g., scheduling), component management, networking, security settings, and so on. The services 830 may provide other common services for the other software layers. In some examples, the services 830 include an interrupt service. The interrupt service may detect the receipt of a hardware or software interrupt and, in response, cause the software architecture 802 to pause its current processing and execute an ISR when an interrupt is received. The ISR may generate an alert.

The drivers 832 may be responsible for controlling or interfacing with the underlying hardware. For instance, the drivers 832 may include display drivers, camera drivers, Bluetooth® drivers, flash memory drivers, serial communication drivers (e.g., Universal Serial Bus (USB) drivers), WiFi® drivers, NFC drivers, audio drivers, power management drivers, and so forth depending on the hardware configuration.

The libraries 816 may provide a common infrastructure that may be used by the applications 820 and/or other components and/or layers. The libraries 816 typically provide functionality that allows other software modules to perform tasks in an easier fashion than by interfacing directly with the underlying operating system 814 functionality (e.g., kernel 828, services 830, and/or drivers 832). The libraries 816 may include system libraries 834 (e.g., C standard library) that may provide functions such as memory allocation functions, string manipulation functions, mathematic functions, and the like. In addition, the libraries 816 may include API libraries 836 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 816 may also include a wide variety of other libraries 838 to provide many other APIs to the applications 820 and other software components/modules.

The frameworks 818 (also sometimes referred to as middleware) may provide a higher-level common infrastructure that may be used by the applications 820 and/or other software components/modules. For example, the frameworks 818 may provide various graphical user interface (GUI) functions, high-level resource management, high-level location services, and so forth. The frameworks 818 may provide a broad spectrum of other APIs that may be used by the applications 820 and/or other software components/modules, some of which may be specific to a particular operating system or platform.

The applications 820 include built-in applications 840 and/or third-party applications 842. Examples of representative built-in applications 840 may include, but are not limited to, a contacts application, a browser application, a book reader application, a location application, a media application, a messaging application, and/or a game application. The third-party applications 842 may include any of the built-in applications 840 as well as a broad assortment of other applications. In a specific example, the third-party application 842 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 842 may invoke the API calls 824 provided by the mobile operating system such as the operating system 814 to facilitate functionality described herein.

The applications 820 may use built-in operating system functions (e.g., kernel 828, services 830, and/or drivers 832), libraries (e.g., system libraries 834, API libraries 836, and other libraries 838), or frameworks/middleware 818 to create user interfaces to interact with users of the system. Alternatively, or additionally, in some systems, interactions with a user may occur through a presentation layer, such as the presentation layer 844. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 8, this is illustrated by a virtual machine 848. A virtual machine creates a software environment where applications/modules can execute as if they were executing on a hardware computing device. The virtual machine 848 is hosted by a host operating system (e.g., the operating system 814) and typically, although not always, has a virtual machine monitor 846, which manages the operation of the virtual machine 848 as well as the interface with the host operating system (e.g., the operating system 814). A software architecture executes within the virtual machine 848, such as an operating system 850, libraries 852, frameworks/middleware 854, applications 856, and/or a presentation layer 858. These layers of software architecture executing within the virtual machine 848 can be the same as corresponding layers previously described or may be different.

Figure 9:
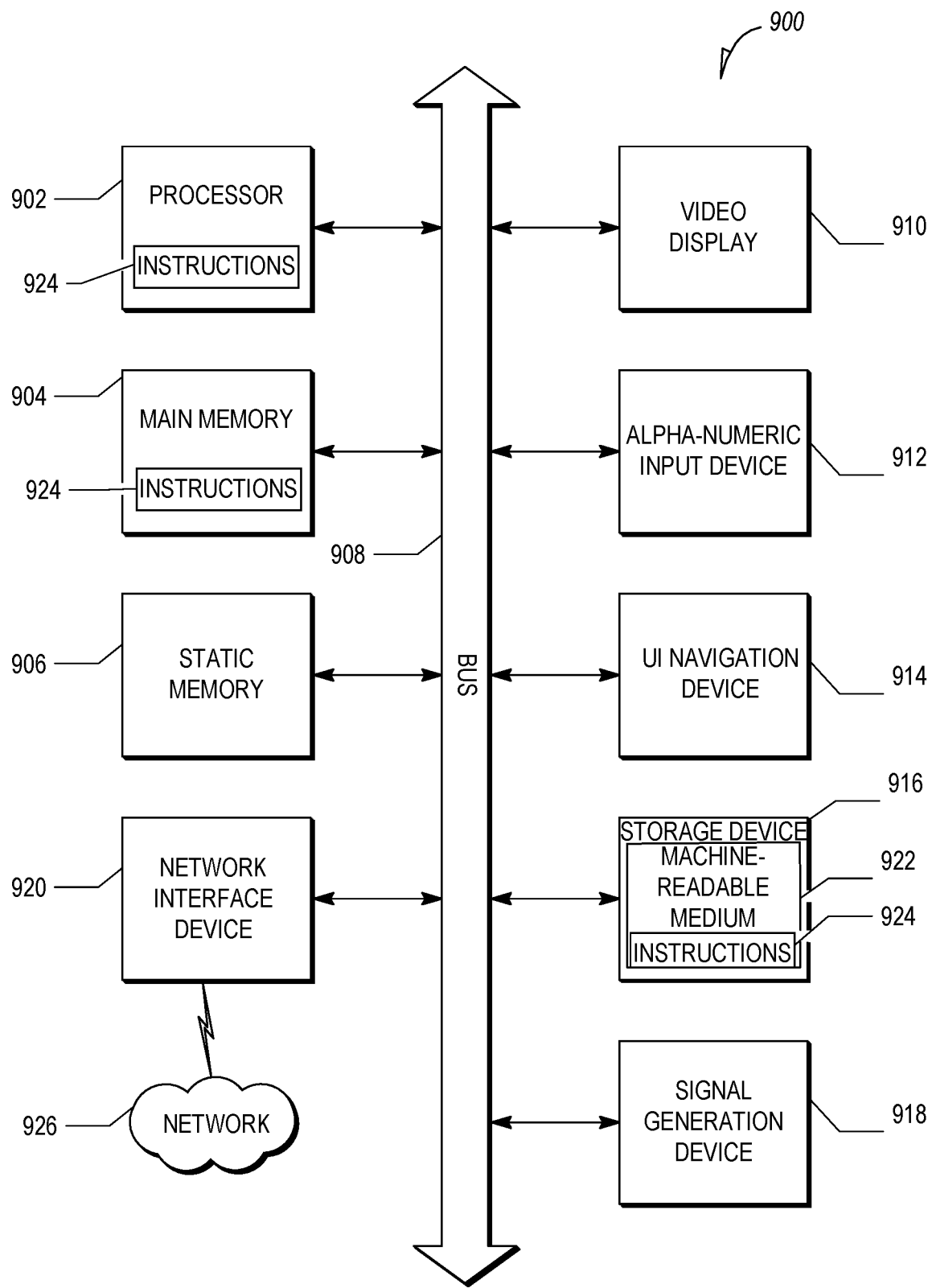
FIG. 9 is a block diagram illustrating a computing device hardware architecture, within which a set or sequence of instructions can be executed to cause a machine to perform examples of any one of the methodologies discussed herein.

FIG. 9 is a block diagram illustrating a computing device hardware architecture 900, within which a set or sequence of instructions can be executed to cause a machine to perform examples of any one of the methodologies discussed herein. The architecture 900 may describe, a computing device for executing the vehicle autonomy system, alertness monitor, labeling system, and/or other systems described herein.

The architecture 900 may operate as a standalone device or may be connected (e.g., networked) to other machines. In a networked deployment, the architecture 900 may operate in the capacity of either a server or a client machine in server-client network environments, or it may act as a peer machine in peer-to-peer (or distributed) network environments. The architecture 900 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example architecture 900 includes a hardware processor unit 902 comprising at least one processor (e.g., a central processing unit (CPU), a graphics processing unit (GPU), or both, processor cores, compute nodes, etc.). The architecture 900 may further comprise a main memory 904 and a static memory 906, which communicate with each other via a link 908 (e.g., bus). The architecture 900 can further include a video display unit 910, an input device 912 (e.g., a keyboard), and a UI navigation device 914 (e.g., a mouse). In some examples, the video display unit 910, input device 912, and UI navigation device 914 are incorporated into a touchscreen display. The architecture 900 may additionally include a storage device 916 (e.g., a drive unit), a signal generation device 918 (e.g., a speaker), a network interface device 920, and one or more sensors (not shown), such as a Global Positioning System (GPS) sensor, compass, accelerometer, or other sensor.

In some examples, the processor unit 902 or another suitable hardware component may support a hardware interrupt. In response to a hardware interrupt, the processor unit 902 may pause its processing and execute an ISR, for example, as described herein.

The storage device 916 includes a machine-readable medium 922 on which is stored one or more sets of data structures and instructions 924 (e.g., software) embodying or used by any one or more of the methodologies or functions described herein. The instructions 924 can also reside, completely or at least partially, within the main memory 904, within the static memory 906, and/or within the processor unit 902 during execution thereof by the architecture 900, with the main memory 904, the static memory 906, and the processor unit 902 also constituting machine-readable media.

Executable Instructions and Machine-Storage Medium

The various memories (i.e., 904, 906, and/or memory of the processor unit(s) 902) and/or storage device 916 may store one or more sets of instructions and data structures (e.g., instructions) 924 embodying or used by any one or more of the methodologies or functions described herein. These instructions, when executed by processor unit(s) 902 cause various operations to implement the disclosed examples.

As used herein, the terms "machine-storage medium," "device-storage medium," "computer-storage medium" (referred to collectively as "machine-storage medium 922") mean the same thing and may be used interchangeably in this disclosure. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media 922 include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms machine-storage media, computer-storage media, and device-storage media 922 specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a matter as to encode information in the signal.

Computer Readable Medium

The terms "machine-readable medium," "computer-readable medium" and "device-readable medium" mean the same thing and may be used interchangeably in this disclosure. The terms are defined to include tangible machine-storage media. Thus, the terms include both storage devices/media and carrier waves/modulated data signals.

The instructions 924 can further be transmitted or received over a communications network 926 using a transmission medium via the network interface device 920 using any one of a number of well-known transfer protocols (e.g., HTTP). Examples of communication networks include a LAN, a WAN, the Internet, mobile telephone networks, plain old telephone service (POTS) networks, and wireless data networks (e.g., Wi-Fi, 3G, 4G LTE/LTE-A, 5G or WiMAX networks). The term "transmission medium" shall be taken to include any intangible medium that is capable of storing, encoding, or carrying instructions for execution by the machine, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

The invention claimed is:

1. A vehicle system for a vehicle, the vehicle system comprising:
   a cockpit output device; and
   at least one hardware processor unit programmed to perform operations comprising:

executing a perception system, the perception system being trained to detect objects outside of the vehicle based on sensor data captured by at least one sensor of the vehicle;

receiving a plurality of inputs from a user of the vehicle, the plurality of inputs comprising a first labeling input received from the user and a first alert input received from the user, the first labeling input comprising a user-provided label for a first object outside the vehicle detected by the perception system, the user-provided label indicating a classification of the first object, wherein the first labeling input is used to train the perception system to detect a second object outside of the vehicle, the second object matching the classification of the first object;

determining an input threshold duration, the input threshold duration being based at least in part on a property of a roadway on which the vehicle is present; and after determining that no user input has been received for the input threshold duration, providing an alert prompt to the cockpit output device, the alert prompt causing the cockpit output device to provide the alert prompt to signal to the user to provide a second alert input indicating that the user is alert.

2. The vehicle system of claim 1, further comprising:
a cockpit input device, wherein the at least one hardware processor unit is further programmed to perform operations comprising:
detecting the first object based at least in part on the sensor data captured by the at least one sensor of the vehicle;
providing an indication of the first object to the cockpit output device; and
receiving, via the cockpit input device, the first labeling input from the user.

3. The vehicle system of claim 1, wherein the user-provided label for the first object outside the vehicle comprises an audio recording provided by the user.

4. The vehicle system of claim 1, further comprising a plurality of buttons positioned at a cockpit of the vehicle, wherein a first button of the plurality of buttons is indicative of a first labeling input type, wherein a second button of the plurality of buttons is indicative of a second labeling input type, and wherein the user-provided label for the first object outside the vehicle comprises data indicating one of the plurality of buttons that was actuated.

5. The vehicle system of claim 1, wherein the first labeling input is received at a first time, and at least one hardware processor unit is further programmed to perform operations comprising:
accessing first sensor data captured at the first time;
detecting the first object using the first sensor data; and
storing a first training data package comprising the first labeling input, the first sensor data, and an indication of the first object.

6. The vehicle system of claim 1, wherein the first labeling input is received at a first time, and wherein the at least one hardware processor unit is further programmed to perform operations comprising:
determining first sensor data captured by the vehicle at the first time; and
storing an indication that the first sensor data corresponds to the first object.

7. The vehicle system of claim 1, wherein the first labeling input is received at a first time, wherein the first labeling input comprises a description of a vehicle control input, and wherein the at least one hardware processor unit is further programmed to perform operations comprising:
determining first sensor data captured by the vehicle at the first time; and
storing an indication that the first sensor data corresponds to the vehicle control input.

8. The vehicle system of claim 1, wherein the at least one hardware processor unit is further programmed to perform operations comprising determining that no response to the alert prompt is received within a response threshold duration.

9. The vehicle system of claim 8, wherein the at least one hardware processor unit is further programmed to perform operations comprising, after determining that no response to the alert prompt is received within the response threshold duration, stopping the vehicle.

10. The vehicle system of claim 8, wherein the at least one hardware processor unit is further programmed to perform operations comprising, after determining that no response to the alert prompt is received within the response threshold duration, disengaging a vehicle autonomy system.

11. The vehicle system of claim 1, the property of the roadway being at least one of a type of the roadway and a speed limit on the roadway.

12. A method for operating an autonomous vehicle, comprising:
executing a perception system at the autonomous vehicle, the perception system being trained to detect objects outside of the autonomous vehicle based on sensor data captured by at least one sensor of the autonomous vehicle;

receiving a plurality of inputs from a user of the autonomous vehicle, the plurality of inputs comprising a first labeling input received from the user and a first alert input received from the user, the first labeling input comprising a user-provided label for a first object outside the autonomous vehicle detected by the perception system, the user-provided label indicating a classification of the first object, wherein the first labeling input is used to train the perception system to detect a second object outside of the autonomous vehicle, the second object matching the classification of the first object;

determining an input threshold duration, the input threshold duration being based at least in part on a property of a roadway on which the autonomous vehicle is present; and after determining that no user input has been received for the input threshold duration, providing an alert prompt to a cockpit output device, the alert prompt causing the cockpit output device to provide the alert prompt to signal to the user to provide a second alert input indicating that the user is alert.

13. The method of claim 12, further comprising:
detecting the first object based at least in part on the sensor data captured by the at least one sensor of the autonomous vehicle;
providing an indication of the first object to a cockpit output device; and
receiving, via a cockpit input device, the first labeling input from the user.

14. The method of claim 12, wherein the user-provided label for the first object outside the autonomous vehicle comprises an audio recording provided by the user.

15. The method of claim 12, wherein the first labeling input is received at a first time, further comprising:
  accessing first sensor data captured at the first time;
  detecting the first object using the first sensor data; and
  storing a first training data package comprising the first labeling input, the first sensor data, and an indication of the first object.

16. The method of claim 12, wherein the first labeling input is received at a first time, further comprising:
  determining first sensor data captured by the autonomous vehicle at the first time; and
  storing an indication that the first sensor data corresponds to the first object.

17. The method of claim 12, wherein the first labeling input is received at a first time, wherein the first labeling input comprises a description of a vehicle control input, and further comprising:
  determining first sensor data captured by the autonomous vehicle at the first time; and
  storing an indication that the first sensor data corresponds to the vehicle control input.

18. The method of claim 12, further comprising determining that no response to the alert prompt is received within a response threshold duration.

19. The method of claim 18, further comprising, after determining that no response to the alert prompt is received within the response threshold duration, stopping the autonomous vehicle.

20. A machine-readable medium comprising instructions thereon that, when executed by at least one processor unit, cause the at least one processor unit to perform operations comprising:
  executing a perception system at a vehicle, the perception system being trained to detect objects outside of the vehicle based on sensor data captured by at least one sensor of the vehicle;
  receiving a plurality of inputs from a user of vehicle, the plurality of inputs comprising a first labeling input received from the user and a first alert input received from the user, the first labeling input comprising a user-provided label for an object outside the vehicle, the user-provided label indicating a classification of a first object outside the vehicle detected by the perception system wherein the first labeling input is used to train the perception system to detect a second object outside of the vehicle, the second object matching the classification of the first object;
  determining an input threshold duration, the input threshold duration being based at least in part on a property of a roadway on which the vehicle is present; and
  after determining that no user input has been received for the input threshold duration, providing an alert prompt to a cockpit output device, the alert prompt causing the cockpit output device to provide the alert prompt to signal to the user to provide a second alert input indicating that the user is alert.

* * * * *